US009697551B1

(12) United States Patent
Bilger

(10) Patent No.: US 9,697,551 B1
(45) Date of Patent: Jul. 4, 2017

(54) TRANSPARENCY IN HIDDEN TRANSACTION DETAILS

(71) Applicant: Amazon Technologies, Inc., Reno, NV (US)

(72) Inventor: Jeffrey Matthew Bilger, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 889 days.

(21) Appl. No.: 13/708,777

(22) Filed: Dec. 7, 2012

(51) Int. Cl.
*G06Q 30/00* (2012.01)
*G06Q 30/06* (2012.01)

(52) U.S. Cl.
CPC ............... *G06Q 30/0609* (2013.01)

(58) Field of Classification Search
CPC ...................................................... G06Q 30/00
See application file for complete search history.

(56) References Cited

U.S. PATENT DOCUMENTS

| | | | | |
|---|---|---|---|---|
| 7,562,304 B2 * | 7/2009 | Dixon | ............... | G06F 17/30861 705/35 |
| 8,639,544 B1 * | 1/2014 | Flemma, Jr. | ....... | G06Q 30/0248 705/7.11 |
| 8,903,816 B2 * | 12/2014 | Dumon | ............. | G06F 17/30979 707/706 |
| 9,123,069 B1 * | 9/2015 | Haynes | ............... | G06Q 30/0625 |
| 2001/0007098 A1 * | 7/2001 | Hinrichs | ................ | G06Q 30/02 705/14.23 |
| 2002/0032573 A1 * | 3/2002 | Williams | ............... | G06Q 10/08 705/335 |
| 2006/0064339 A1 * | 3/2006 | Allred | ................ | G06Q 30/0201 705/7.29 |
| 2006/0095343 A1 * | 5/2006 | Clarke | ............... | G06Q 30/0207 705/14.1 |
| 2006/0242192 A1 * | 10/2006 | Musgrove | ......... | G06F 17/30864 |
| 2007/0073599 A1 * | 3/2007 | Perry | ..................... | G06Q 30/02 705/26.5 |
| 2008/0091546 A1 * | 4/2008 | Kirovski | ............ | G06Q 30/0603 705/26.64 |

(Continued)

OTHER PUBLICATIONS

Reich, Robert, "Toward a new Consumer protection", University of Pensylvania Law Review, vol. 128; dated Nov. 1979.*

(Continued)

*Primary Examiner* — Mark Fadok
(74) *Attorney, Agent, or Firm* — Lee & Hayes, PLLC

(57) ABSTRACT

Techniques and systems provide transparency in hidden transaction details for an item. A process comprises crawling one or more electronic marketplaces to identify an item presented in an item offering, extracting offer details in the item offering, emulating an ordering process for acquiring the item to determine transaction details that are revealed after the ordering process is initiated, and presenting at least a portion of the transaction details with item and offer details. In some embodiments, the offer details include a list price for the item, and the transaction details include a true price for the item with a hidden cost included in the true price. The hidden cost may be compared to a threshold to determine if it is excessive. A seller identified with the item offering may be designated with a rating indicative of a reputation of the seller for providing excessive hidden costs with item offerings.

22 Claims, 8 Drawing Sheets

(56) References Cited

U.S. PATENT DOCUMENTS

| | | | | |
|---|---|---|---|---|
| 2009/0138458 A1* | 5/2009 | Wanker | ............ | G06F 17/30864 |
| 2009/0234722 A1* | 9/2009 | Evevsky | ................ | G06Q 30/02 705/14.1 |
| 2010/0153259 A1* | 6/2010 | Stanton | .............. | G06Q 30/0283 705/38 |
| 2010/0262601 A1* | 10/2010 | Dumon | ............ | G06F 17/30979 707/727 |
| 2011/0004693 A1* | 1/2011 | Rehfuss | ................ | G06Q 30/02 709/229 |
| 2011/0162052 A1* | 6/2011 | Hayward | ................ | G06F 21/41 726/5 |
| 2013/0246213 A1* | 9/2013 | Lee | .................... | G06Q 30/0283 705/26.4 |
| 2013/0275249 A1* | 10/2013 | McAfee | ................ | G06Q 30/02 705/26.1 |

OTHER PUBLICATIONS

Reich, Robert, "Towards a New Consumer Protection", University of Pennsylvania Law Review, vol. 128:1, pp. 1-40.*

* cited by examiner

TRANSPARENCY IN HIDDEN TRANSACTION DETAILS

BACKGROUND

Many retailers recognize that consumers are attracted to low sale prices and will be more likely to inquire about, and sometimes purchase, items listed at such low prices. However, retailers must balance this incentive with the need to make a profit on sales of their items. This leads some retailers to engage in behavior that amounts to a "bait-and-switch" tactic where the retailer hides the "true" cost of the item by omitting some fees or charges (e.g., excessive shipping and handling fees) from the list price of the item. In these cases, the retailer's list price is often lower than prices offered by competitors, yet the retailer is still able to receive a healthy profit by adding on hidden fees late in the ordering process. A consumer, attracted to the low list price of the item, will often expend some amount of effort toward acquiring the item (e.g., adding the item to a virtual cart, proceeding through the checkout process, etc.) before realizing much later in the ordering process that there are hidden costs that will be added to the list price upon completing a transaction for the item. In some cases, consumers will buy the item after seeing the hidden costs due to the amount of effort they have already expended during the ordering process. Retailers bait consumers in other ways, such as by claiming that there is "limited availability" of an item, when in fact the retailer's inventory is not so limited. Hiding transaction details (e.g., additional cost, actual quantity available, and the like) often leads to poor customer experience. Furthermore, for a host of an online marketplace for retailers, such "bad" behavior of retailers may tarnish the good will of the host.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
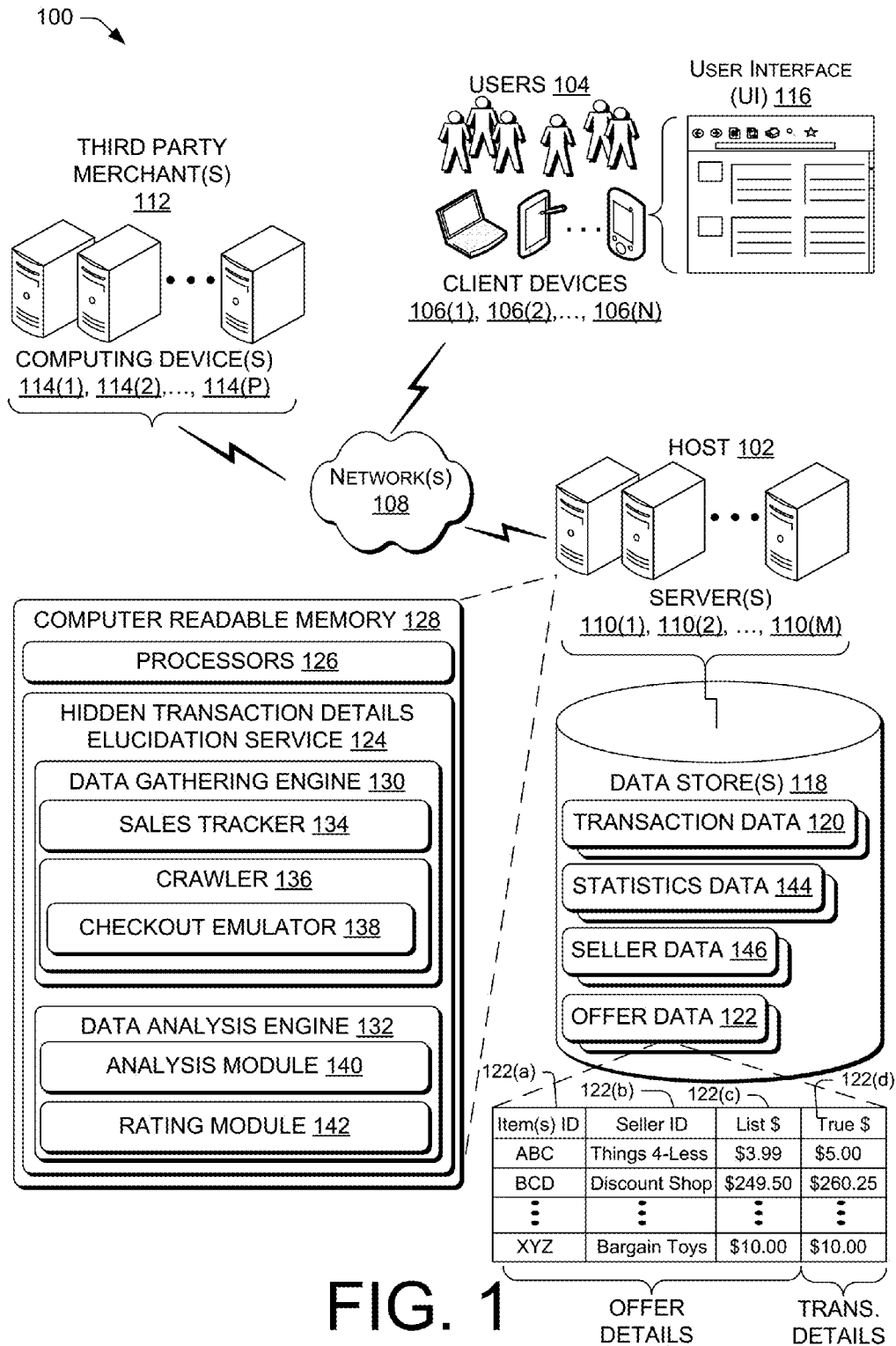
FIG. 1 illustrates an example architecture for implementing a service for providing transparency in hidden transaction details.

Embodiments of the present disclosure are directed to, among other things, techniques and systems to provide transparency in hidden transaction details. Hidden transaction details may comprise a true price for an item and/or a hidden cost associated with an item transaction, an actual quantity of the item available for purchase, or similar transaction details. For example, when a retailer (seller) hides excessive fees or costs that are to be included later in an ordering process for an item (referred to herein as a "hidden cost"), techniques and systems disclosed herein can reveal the hidden cost and/or a "true" price of the item (i.e., the sum of the list price and the hidden cost) to a user (buyer) such that the user is better informed without having to expend any unnecessary effort toward acquiring the item. That is, the techniques and systems disclosed herein enable the user to browse items while being fully informed of the true transaction details (e.g., price, available quantity, etc.) associated with each item, or group of items. Embodiments disclosed herein find particular application for online electronic commerce (e-commerce) marketplaces that sell items (e.g., products, services, etc.) to consumers, and will be described with particular reference thereto. However, it is to be appreciated that the disclosed embodiments may also be utilized in other similar applications, including price comparison services, web-search engines, and social commerce sites, to name only a few.

In some embodiments, a process for providing transparency in hidden transaction details comprises crawling one or more pages (e.g., websites, etc.) to identify an item presented in an item offering, extracting offer details in the item offering, emulating an online ordering process for acquiring the item to determine transaction details that are revealed after the online ordering process is initiated, and presenting at least a portion of the transaction details with the offer details in an electronic offering of the item.

In some embodiments, a graphical user interface (GUI) for providing transparency in hidden transaction details comprises a first area to identify an item being offered in an electronic item offering, and a second area to present offer details with the item, the offer details comprising at least a list price for the item, the second area further configured to present transaction details associated with the item, the transaction details comprising at least a true price for the item determined by previously emulating an online ordering process for the item, the true price being a sum of the list price and a hidden cost including any added charges that are included for the item after the initiation of the online ordering process.

In some embodiments, the hidden cost may be compared to a threshold to determine if the hidden cost is excessive. Furthermore, a seller may be identified who is offering the item, and the seller may be designated with a rating indicative of a reputation of the seller for providing excessive hidden costs with item offerings. A seller's activities may be monitored and analyzed over time to link transaction data with offer data, and true price comparisons may be made across multiple sellers.

By making hidden transaction details for an item transparent, users (e.g., consumers, merchandisers, etc.) are better informed when making purchasing decisions, and the acquisition process for items available online may be streamlined such that consumers do not expend unnecessary effort toward acquiring an item by knowing the true transaction details up front in the browsing experience.

The techniques and systems described herein may be implemented in a number of ways. Example implementations are provided below with reference to the following figures.

Illustrative Environment

FIG. 1 is a schematic diagram of an illustrative computing environment 100 to provide transparency in hidden transaction details associated with an item offering. The environment 100 may include a host 102 to implement a service to provide transparency in hidden transaction details that enables users 104 to be better informed about true transaction details associated with one or more items that are offered for sale on an online retail site. The users 104 (sometimes referred to herein as "consumers" or "buyers") may be individuals, organizations, merchandisers, or any other suitable entity. The host 102 may be a retailer, merchant, seller, site operator, or other entity that facilitates acquisition of one or more items by the users 104 via a site maintained by the host 102.

As an overview, items may be any tangible or non-tangible items capable of being acquired via an online transaction. A non-exhaustive list of items may include physical products, downloaded or streamed digital products (e.g., audio or video files, electronic books (e-books), etc.), services (e.g., pre-paid professional services supported by a certificate, etc.), sellable units, customer profiles, customer-created content, or anything else which might be consumed, purchased, rented, subscribed to, leased, loaned or viewed (hereinafter "acquired") physically, digitally or otherwise via a payment transaction. Items may also be bundled wherein groups of two or more items may be offered for sale and thereby purchased with a single transaction, typically via a single details page and/or a single catalog item.

In various embodiments, the host 102 may be in communication with one or more client devices 106(1), 106(2), . . . , 106(N) ("clients") through a network(s) 108. The network 108 represents any one or combination of multiple different types of networks, such as wide area networks (WANs) or local area networks (LANs) and including cable networks, the Internet, and wireless networks. The clients 106(1)-(N) may enable the users 104 to interact with the host 102, such as to acquire an item. The clients 106 may be implemented as any number of computing devices, including a personal computer, an electronic book reader (e-book reader), a tablet computer, a mobile telephone, a personal digital assistant (PDA), a television, a set top box, a gaming console, and so forth. Each client computing device is equipped with one or more processors and memory to store applications and data. According to some embodiments, a browser application is stored in the memory and executes on the one or more processors to provide access to the website. Although embodiments are described in the context of a web-based system, other types of client/server-based communications and associated application logic could be used.

The host 102 may be hosted on one or more servers 110(1), 110(2) . . . , 110(M), perhaps arranged as a server farm or a server cluster. Other server architectures may also be used to implement the host 102. The host 102 is capable of handling requests, such as in the form of a uniform resource locator (URL), from many users 104 and serving, in response, various information and data, such as in the form of a web page, to the clients 106(1)-(N), allowing the users 104 to interact with the data provided by the servers 110(1)-110(M). In this manner, the host 102 is representative of essentially any site supporting user interaction, including online retailer/marketplace sites, electronic commerce (e-commerce) sites, price comparison sites, social media sites, search engine sites, blog sites, news and entertainment sites, informational sites, sites providing content for streaming or downloading, and so forth. In the context of an online retailer/marketplace site, or an e-commerce website, the returned web page may allow the users 104 to browse and/or search an electronic catalog and complete a transaction for one or more items.

In some embodiments, the host 102 may offer, via an electronic marketplace, items to users 104 who may browse and/or search the items available from the host 102, or items available from a third party merchant(s) 112 whose items may be hosted on the host's 102 electronic marketplace. The third party merchant(s) 112 may use computing devices 114(1), 114(2), . . . , 114(P) in order to access the server(s) 110(1)-(M) for selling items that the third party merchant(s) 112 has available for offering. The users 104 may enter into a transaction for one or more of the items offered on the electronic marketplace by accessing the electronic marketplace via the network 108. In some embodiments, the clients 106(1)-(N) may cause the display of a user interface (UI) 116 to enable a respective user 104 to interact with the server(s) 110(1)-(M) through an application that renders pages served by the electronic marketplace. For example, the user 104 may communicate with the host 102 via the user interface 116 on the client 106(1) to acquire an item via a transaction with a merchant or seller who offers the item on a site of the host 102.

The server(s) 110(1)-(M) may be in communication with a data store(s) 118, such as a database, or a similar data repository. The data store 118 may store transaction data 120 associated with items that have been acquired by the users 104. Transaction data 120 may comprise information about particular items, or groups of items (i.e., bundles), that have been acquired or otherwise purchased by the users 104, including information such as a total transaction amount along with a breakdown of item cost plus any associated fees (e.g., shipping and handling, taxes, etc.), the date and time of the transaction, the geographic location of the acquiring entity (e.g., zip code, city and state, etc.), and similar data relating to a completed transaction for items. Items are typically designated and indexed by an identification number in the data store 118, while users 104 may be similarly identified and indexed by user identifiers (e.g., user name, account number, etc.).

In addition to the transaction data 120, the data store 118 may further store offer data 122 associated with items currently offered via a site of the host 102. As distinguished from the transaction data 120, the offer data 122 pertains to items that have not yet been acquired by the users 104. The offer data 122 generally comprises two categories of information: (1) offer details, and (2) transaction details. Offer details associated with an item (or group of items) generally comprise information that a seller provides to a potential buyer on the front end of the ordering process, and may include an item identification (ID) 122(*a*), a seller ID 122(*b*), a list price 122(*c*), a listed quantity of items in stock, and similar information the user 104 would typically be presented with on a details page for an item. The second category of information included in the offer data 122 covers transaction details, which generally comprise any downstream information associated with the transaction that may be learned later in the ordering process (i.e., downstream), and may include a true price for the item 122(*d*), a hidden cost associated with the item transaction (e.g., shipping and handling costs, taxes, etc.), and similar transaction details that are often revealed later in the ordering process for the item. The offer data 122 is continuously gathered via components stored on the server(s) 110(1)-(M), details of which will be described below. It is to be appreciated that the data store 118 may maintain any suitable type of data, some of which will be described in more detail below, such as statistics data and seller rating data, as well as a full index of items in a catalog, payment data associated with the users 104 (e.g., saved methods of payment, payment instruments, etc.), user account information for each of the users 104, and the like.

As mentioned above, it would behoove a seller to offer items at as low a list price as possible in order to attract consumers. If a seller can manage to list a given item for a price that is lower than the seller's competition, while still turning a profit on a transaction for the item, the seller will, more often than not, outperform the competition. However, some seller's are compelled to engage in a bait-and-switch tactic in order to take advantage of this known tool for attracting consumers. For example, a seller might list an item, or group of items, at a low list price, only to charge excessive fees on the back end of the ordering process after a significant amount of effort has been expended by the user 104. As another example, a seller might state in the offer details for an item, or group of items, that only a limited quantity of those items are left in stock, such that the user 104 feels as though he/she must hurry to acquire the item before there are no more left in stock. In this scenario, if the seller in fact has more than the quantity of items in inventory that is listed on a details page for the item, this is considered a bait-and-switch maneuver by the seller that results in a poor customer experience.

Accordingly, FIG. 1 illustrates that the servers 110(1)-(M) implement a hidden transaction details elucidation service 124 which provides transparency in hidden transaction details. The servers 110(1)-(M) are equipped with one or more processors 126 and one or more forms of computer-readable memory 128. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 128 may be used to store any number of functional, or executable, components, such as programs and program modules that are executable on the processor(s) 126 to be run as software. Each component stored in the computer-readable memory 128 may comprise computer-executable instructions that, when executed, cause the one or more processors 126 to perform acts and to implement techniques described herein. Each component may be in the form of data structures, program modules, or other data. The components included in the computer-readable memory 128 may include the hidden transaction details elucidation service 124, as well as a data gathering engine 130 and a data analysis engine 132, each of which may themselves comprise modules to enable transparency in hidden transaction details.

In some embodiments, the data gathering engine 130 includes a sales tracker 134, and a crawler 136. The sales tracker 134 is configured to track and record information associated with sales of items in the form of the transaction data 120 in the data store 118. The sales tracker 134 is configured to continuously monitor completed transactions for items offered via a site of the host 102. For each completed transaction, the sales tracker 134 records information associated with the transaction for each item, or group of items. As described above, the transaction data 120 gathered by the sales tracker 134 may include the total transaction amount for an item along with a breakdown of item cost plus any associated fees (e.g., shipping and handling, taxes, etc.), the date and time of the transaction, the geographic location of the purchasing entity (e.g., zip code, city and state, etc.), and similar transaction data relating to the transaction for items. The transaction data 120 may be stored and indexed in association with both sellers and buyers, who are perhaps identified by identifiers (e.g., account number, etc.).

The crawler 136 comprises instructions in the form of a computer program that browses a particular site, and/or multiple sites, in a methodical, automated manner. Such computer programs are often referred to as web spiders or Internet robots (bots), which can be thought of as software agents capable of running automated tasks over the Internet or other networks. At its core, the crawler 136 is responsible for accessing and storing information gathered from one or more web servers. For example, the crawler 136 may access websites that offer items (e.g., a site operated by the host 102) to identify items, or bundles, that are offered for sale to the users 104, and the crawler 136 may harvest/extract information associated with those items for storage in the data store 118.

The crawler 136 may use various techniques for crawling the web or other networks/devices in search of information pertaining to items for sale. For instance, the crawler 136 may start with a list of uniform resource locators (URLs) and recursively visit each URL on the list according to a set of policies. For example, a selection policy may direct the crawler 136 to prioritize and download particular web pages of URLs for extraction of information therein according to a period of time since the crawler 136 last visited a particular URL on the list. Additionally, or alternatively, the crawler 136 may utilize heuristics, a machine learned model, a random walk, a combinatorial exhaustive search, and similar techniques for crawling in a methodical manner. For example, rather than scouring the entire web and every web page thereon in search of items, heuristics and similar techniques may be utilized to ignore web pages unlikely to contain information associated with an item transaction based on a history of crawling certain URLs. In some embodiments, the crawler 136 crawls a single website (e.g., a site maintained by the host 102) which includes a plurality of web pages associated with item offerings. Furthermore, it is to be appreciated that the crawler 136 may be a single web crawler, or it may comprise multiple distributed web crawlers to efficiently mine information from multiple sites in parallel.

As part of the data gathering process, the crawler 136 may be further configured to emulate human activity on the Internet, such that the crawler 136 mimics the actions of a human user (e.g., a user 104). In some embodiments, the crawler 136 employs a checkout emulator 138 to mimic an ordering/checkout process for an item, such as a typical ordering process that is carried out by a user 104 in a real online transaction for the item. Accordingly, upon the crawler 136 navigating to a web page which includes an item offering, the checkout emulator 138 is configured to add the item to a virtual cart (e.g., electronic shopping cart), and to proceed through a checkout process for the item on the accessed web page up to a point in the ordering process without actually acquiring the item. In this manner, the checkout emulator 138 is able to determine, at this point in the ordering process, transaction details that typically are not revealed to a user 104 earlier in the ordering process. For example, a hidden cost including added fees and charges (e.g., shipping and handling, taxes, etc.), or a quantity of the item that is available for purchase, may be provided after the checkout emulator 138 proceeds to a certain point in the ordering process. The crawler 136 is configured to run continuously and in an automated fashion in order to determine offer details and transaction details (i.e., the offer data 122) for items, and to store this gathered information in the data store 118.

In some embodiments, the checkout emulator 138 is further configured to emulate a checkout process for an item over various parameters and permutations of multiple parameters. For example, during the checkout process, the checkout emulator 138 may be required to specify one or more parameters (e.g., a zip code, a method of payment, a shipping method, etc.) before the ultimate transaction details are determined. This may be the case when retailers have dynamic pricing models that vary based on specified parameters. If a parameter is required to determine transaction details associated with the item, the checkout emulator 138 may be configured to iterate through all possible parameter values, or the checkout emulator 138 may be programmed to run the checkout process over a particular set of parameters. Heuristics may be utilized to select parameters of interest that enable transparency of transaction details that are relevant to the users 104.

Whether parameters need to be specified or not, the checkout emulator 138 is able to determine, for a particular item, or bundle of items, the true transaction details associated with the item(s) (e.g., the true price) by proceeding through a simulated ordering process. It follows that, when the users 104 search and/or browse for items on a site maintained by the host 102, the hidden transaction details elucidation service 124 may provide transparency in the hidden transaction details to the users 104 such that the users 104 are better informed in making purchasing decisions. The hidden transaction details elucidation service 124 allows for a better customer experience because it takes away from the user 104 the burden of expending unnecessary energy to find out true transaction details associated with an item.

In some embodiments, the data analysis engine 132 includes an analysis module 140, and a rating module 142. The analysis module 140 is configured to analyze some or all of the data stored in the data store 118. For instance, the analysis module 140 may be configured to access the offer data 122 and to calculate a difference between a listed price for an item and a true price for the item. The result of such a calculation is referred to herein as the "hidden cost" of the item. The hidden cost may be compared to a threshold number to determine whether the calculated hidden cost for an item is "excessive," or higher than normal. This threshold may be predetermined by the host 102 as a value that is deemed to be a good measure of whether hidden cost values are excessive, which may be indicative of bait-and-switch behavior from sellers. In some embodiments, different categories of items (e.g., cameras, televisions (TVs), home cleaning services, etc.) are associated with different hidden cost thresholds, below which hidden cost values are deemed typical or acceptable for the given item category.

In some embodiments, excessiveness of hidden costs may be based on a threshold with respect to a bell curve which plots hidden costs included with an item across a plurality of different merchants who sell the same item. In this scenario, hidden cost values that exceed a predetermined threshold on the bell curve (e.g., above two standard deviations from the mean hidden cost among all sellers) may be designated as excessive hidden cost values. In this manner, relative price information may be used for comparison and determination of atypical hidden cost values.

The hidden transaction details elucidation service 124 may reveal, by highlighting or otherwise providing transparency into, items with excessive hidden costs for users 104 who search for, or browse, the items. In this way, items designated with excessive hidden costs may be identified by the users 104 on the front end of the ordering/checkout process so that the users 104 do not have to proceed further into the ordering process to learn of the transaction details. In some embodiments, the hidden transaction details elucidation service 124 may provision the determined transaction details to new merchants (e.g., new third party merchants 112) so that these new merchants may reference hidden cost statistics across various categories of items for setting their own fees and costs associated with similar item transactions. For example, a new seller who desires to sell an item on a site maintained by the host 102 may leverage the hidden transaction details elucidation service 124 to find out a range of hidden cost values that are typical for the type of item they wish to sell. This would allow new sellers to calibrate the pricing information of their item offerings in a more efficient manner.

In some embodiments, the analysis module 140 is configured to determine whether a quantity of items listed to be in stock is lower than the actual number of items in stock. As described above, the checkout emulator 138 is capable of checking out a quantity of items that exceeds the listed quantity of items by one item. If the checkout emulator 138 is successful in proceeding to checkout more than the listed quantity of items in stock, the analysis module 140 designates the listed quantity as being lower than the actual quantity, or otherwise highlights the listed quantity for providing transparency into the true transaction details. For example, a seller may offer an item for sale by advertising that only two items remain in stock. The seller may even suggest on a details page for the item that consumers hurry before the item is sold out. Accordingly, the analysis module 140 may determine whether the checkout emulator 138 was able to order three of those items during the checkout process, and if so, the analysis module 140 may provide an indicator associated with the item offering that the listed quantity is false. Similarly, the analysis module 140 may monitor whether the checkout emulator 138 was able to add even a single item (i.e., quantity of one) to a virtual cart for checkout, and if not, a similar indicator may be associated with the item to indicate that the item is not available for purchase.

The data analysis engine 132 may further comprise a rating module 142 configured to determine a seller rating which is indicative of the "trustworthiness" of a seller based on the behavior of the seller as monitored by the hidden transaction details elucidation service 124. That is, the seller rating may be indicative of how trustworthy the seller is with respect to the information they list online for items they are selling. By providing the users 104 transparency into the seller rating, sellers are given incentives that encourage good behavior. For instance, a seller that often uses bait-and-switch tactics, as previously described, will likely have a low seller rating according to the techniques and systems disclosed herein, and as such, the users 104 will be informed of the trustworthiness of the seller and will be able to make a more informed decision about acquiring items from the seller. In some embodiments, a hierarchical rating model may be utilized where a seller may be designated with an overall rating based on cumulative historical behavior of the seller regarding offer details provided by the seller, and/or the seller may be rated on other levels, such as with regard to a product category (e.g., cameras), and/or the seller may be rated on an item level such that the item-level rating indicates the trustworthiness of the seller with respect to a particular item only.

The rating module 142 is configured to designate a seller rating for a seller based on certain criteria. One example criterion by which a seller rating may be determined is whether the hidden cost amount, as determined by the analysis module 140, exceeds a threshold amount associated with an item offered for sale by the seller. For example, if the analysis module 140 determines that a seller is including excessive hidden costs for a particular item, the rating for that seller may be designated as "untrustworthy," as with a binary trust level designation of trustworthy/untrustworthy, or the seller's existing rating may be decremented by a predetermined amount on a rating spectrum that indicates varying levels of trustworthiness of a seller. The rating spectrum may describe a minimum and maximum trust level that a given seller may achieve. One illustrative example of a rating spectrum is a spectrum of "Red-Yellow-Green," where "Red" indicates a rating of least trustworthy and "Green" indicates a rating of most trustworthy. In some embodiments, a seller who has not previously been designated with a rating is assigned a default rating which may be a neutral designation of trustworthiness (e.g., Yellow, or No Rating). It is to be appreciated that other ways of indicating a seller rating may be used, such as numbering schemes, or any suitable rating scheme.

Another example criterion by which a seller rating may be determined is whether the listed quantity of items in stock is lower than an actual quantity of items in stock. As noted above, the checkout emulator 138 may be configured to add a quantity of items in excess of a listed quantity of items in stock such that the rating module 142 may designate a seller rating based on the success of the checkout emulator 138 in doing so. Similarly, the analysis module 140 may determine that no items are available for purchase based on the checkout emulator's 138 inability to add even a single item to a virtual cart, and the rating module 142 may designate a seller rating based on this determination in a similar fashion.

Yet another criterion by which a seller rating may be determined is whether the seller frequently uses bait-and-switch tactics over a period of time. As will be described in more detail below, the analysis module 140 may analyze the offer data 122 over time to determine whether a seller frequently includes an excessive hidden cost as measured by a threshold over a given period. For example, a seller that is found to include excessive hidden costs for items more than two times per month may be designated as untrustworthy via a seller rating. In other words, if the seller is found to have been engaging in a pattern of bad behavior, this can be a criterion for designating a poor seller rating. Other suitable ways of monitoring seller behavior for designating seller ratings may be contemplated without changing the basic characteristics of the system.

The data analysis engine 132 may store data generated by either or both of the analysis module 140 or the rating module 142 in the data store 118. As shown in FIG. 1, the analysis module 140 may store statistics data 144 (described in more detail below) in the data store 118. Likewise, the rating module 142 may store seller data 146 in the data store 118, such as the seller ratings indexed in association with each seller record.

It is to be appreciated that the hidden transaction details elucidation service 124 may be implemented and utilized by the host 102, or it may optionally be provided to or sold (e.g., via subscriptions, etc.) to third parties. In some cases, third party access may be enabled through an application programming interfaces (API) that enables integration of the service on third party web servers over the network(s) 108. Accordingly, the hidden transaction details elucidation service 124 may be internal, or external, to the architecture 100. For example, an entity may use, or pay for access to, the hidden transaction details elucidation service 124 to compare true transaction details for multiple merchants selling items on various websites as part of an overall item searching system. In this manner, the same item sold by various merchants could be compared fairly on the true price, or similar data points.

Illustrative Implementation

Figure 2:
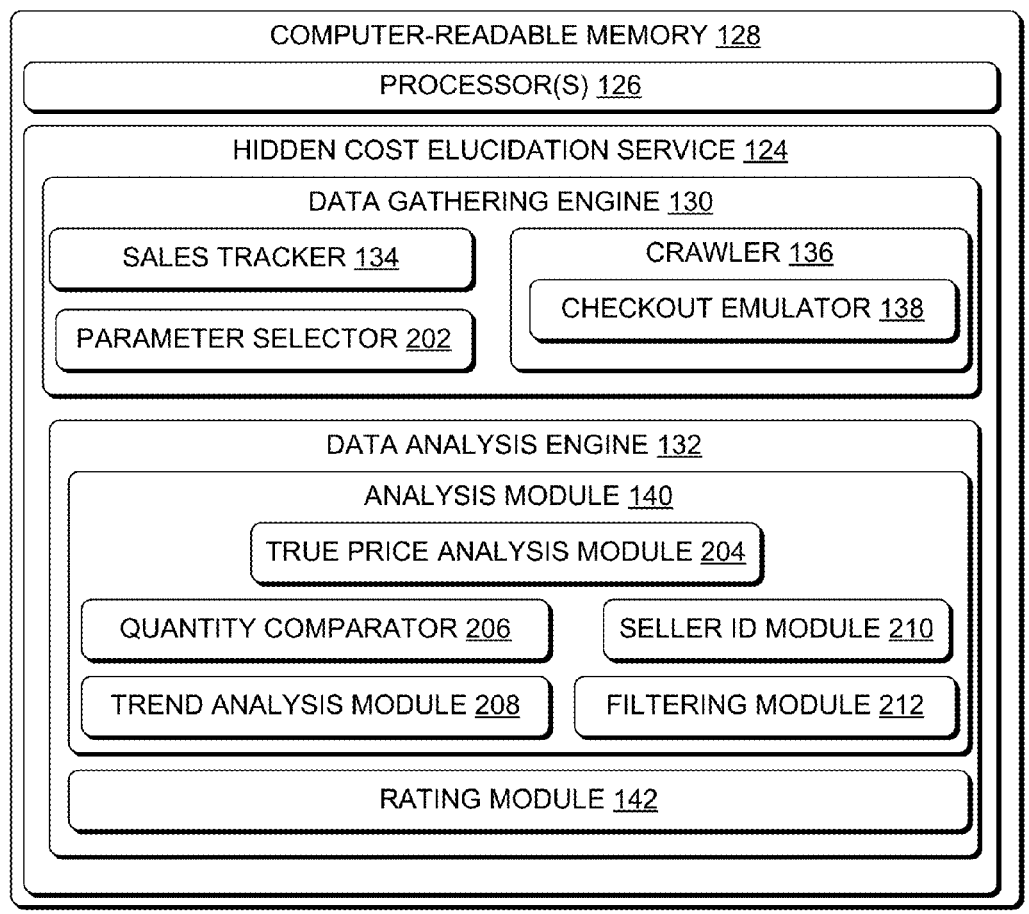
FIG. 2 is a block diagram illustrating embodiments of modules included in a service for providing transparency in hidden transaction details.

FIG. 2 illustrates an example implementation 200 of the hidden transaction details elucidation service 124. FIG. 2 illustrates the data gathering engine 130 and the data analysis engine 132 that were introduced with reference to FIG. 1. The data gathering engine 130 and the data analysis engine 132 may include multiple modules that are implemented as software or computer-executable instructions stored in the computer-readable memory 128 and executed by the one or more of the processors 126 located on the server(s) 110(1)-(M), as described above with reference to FIG. 1.

The data gathering engine 130 is shown to include the sales tracker 134 and the crawler 136 that were also introduced with reference to FIG. 1. The implementation 200 further comprises a parameter selector 202 included in the data gathering engine 130. The parameter selector 202 is configured to work in tandem with the checkout emulator 138 by selecting various parameters that are required to be specified before transaction details are determined for an item. These parameters may include location-based parameters (e.g., a zip code, city and state, street address, IP address, and the like), time-based parameters (e.g., a time of the day, day of the week, and the like), payment-based parameters (e.g., method of payment), and/or item-based parameters (e.g., item quantity, number and/or type of items already in the virtual cart, etc.). Any of these parameters may be required in order to determine transaction details, such as when they have an impact on the value of the true price of a given item.

Accordingly, the parameter selector 202, upon receiving a request from the checkout emulator 138 to specify a parameter, is configured to iteratively select values for the requested parameter for each emulated item transaction. For example, the checkout emulator 138, when carrying out the emulated checkout process for an item, may encounter a field asking for a specification of the zip code of the buyer. The parameter selector 202 may then iteratively specify, for use by the checkout emulator 138, all possible zip codes, or a selected subset of available zip codes, using one zip code for each instance of an item transaction. In some embodiments, the parameter selector 202 may be proactively invoked by the checkout emulator 138 to vary certain parameters that may impact the transaction details for an item. For example, the parameter selector 202 may be configured to add or remove items from the virtual cart which may have an effect on the true price of the item. This may occur where a seller offers a discount to a consumer who buys two of the same type of item (e.g., two digital versatile discs (DVDs)), such that, by checking out a first item while a second item of the same type is in the same virtual cart, the true price of the first item may be offered at a discount, thus affecting the true price of the item. By utilizing the parameter selector 202, the data gathering engine 130 may gather and record transaction details for an item that vary across different parameter values (e.g., different zip codes). The data gathering engine 130 may be configured to run various permutations of the checkout process by utilizing the parameter selector 202 to yield different results for the transaction details of the item.

FIG. 2 further illustrates the data analysis engine 132 comprising the analysis module 140 and the rating module 142 that were introduced with reference to FIG. 1. The analysis module 140 may further include a multitude of modules to carry out various analysis techniques. Generally speaking, the analysis module 140 is configured to analyze data stored in the data store 118, including the transaction data 120, the offer data 122, and the seller data 146 in various ways to generate information that may be of interest to various entities. Accordingly, the analysis module 140 includes a true price analysis module 204 configured to calculate a hidden cost associated with an item transaction as the difference between a listed price for an item and a true price for the item. The true price analysis module 204 may calculate a hidden cost for each emulated item transaction, sometimes across various permutations of parameters, and may store this data in the form of the offer data 122 in the data store 118.

In some embodiments, the true price analysis module 204, is further configured to compare a calculated hidden cost for an item to a threshold hidden cost value to determine whether the calculated hidden cost for the item is excessive, or higher than normal, as described above. The threshold may be predetermined and based at least in part on item category, such that hidden costs calculated for two items in different item categories are to be compared against different hidden cost thresholds. In some embodiments, the hidden cost threshold is defined with respect to a bell curve of plotted hidden costs for the same item across multiple different sellers. For example, a threshold of two standard deviations (2G) from a mean (μ) hidden cost may be chosen as a threshold whereby hidden costs above this mark on a bell curve are designated as excessive. If the true price analysis module 204 determines that a hidden cost for an item is excessive, the analysis module 140 may provide an indicator in association with the item (e.g., highlighted on a details page of the item) signifying that the item transaction includes excessive hidden costs. This may serve as a "warning" label of sorts to notify a buyer of the hidden costs associated with the item. For example, a user 104 browsing an item will be fully informed of the excessive hidden costs without having to proceed further into the ordering process.

In some embodiments, the analysis module 140 further includes a quantity comparator 206 configured to determine whether a quantity of items listed as currently in stock is lower than the actual number of items in stock. This determination may be facilitated by the checkout emulator 138 when attempting to checkout a quantity of items that exceeds the listed quantity of items by one. If the checkout emulator 138 successfully orders more than the listed quantity of items in stock, the quantity comparator 206 may provide an indication that the listed quantity is misrepresented in association with the item. This determination may impact the seller rating determined by the rating module 142. Additionally, or alternatively, the quantity comparator 206 may be configured to monitor whether the checkout emulator 138 was able to add even a single item (i.e., a quantity of one) to a virtual cart for checkout. If not, the quantity comparator 206 may provide an indication that the item is sold out.

In some embodiments, the analysis module 140 further includes a trend analysis module 208 configured to analyze data in the data store 118 over time, such as over the course of a day(s), week(s), month(s), year(s), etc. Through this analysis, various statistical comparisons may be made, and patterns may be revealed whereby seller behavior can be monitored and analyzed. Any and all of the information output by the trend analysis module 208 may be stored as the statistics data 144 and used as an input into designating a seller rating, and/or the statistics data 144 may be used in reports for consumption by various entities, such as the users 104.

As one illustrative example, the offer data 122 (e.g., list price, hidden cost, true price, etc.) may be accessed by the trend analysis module 208 and graphed over time for a given item and/or seller. Patterns may emerge in the graphs and reports generated by the trend analysis module 208 to help identify "repeat offenders," such as sellers that repeatedly and/or frequently hide excessive additional fees and charges in their item offerings. Information generated by the trend analysis module 208 may be useful in determining optimal times to buy from particular sellers, such as time periods where a given seller tends to sell items at a lower true price than they normally do outside of that time period. Additionally, or alternatively, the information may factor into designation of seller ratings.

In some embodiments, the trend analysis module 208 is configured to access the transaction data 120 to graph actual sales information associated with sellers, such as the sale price for each item sold, the quantity of sales, and the like, over time. In this scenario, the trend analysis module 208 may be configured to link the transaction data 120 to the offer data 122 in order to reveal important "follow-through" information associated with sellers. For example, true price information for items may be linked to actual purchase information for the same items to discover any interdependencies and correlations between the data. Demand for items at different true price values may also be observed.

The trend analysis module 208 may also leverage the transaction data 120 to generate likely item combinations and true price information associated with such item combinations. For example, the transaction data 120 may indicate that a vast majority (e.g., more than 90%) of consumers buy a cover for a tablet computer, either with the purchase of the tablet computer, or shortly thereafter. Accordingly, the trend analysis module 208, upon determining this likely combination of items (i.e., tablet computer+cover), may be able to report a true price for the purchase of the tablet and the cover together, and may be able to compare this true price value across multiple sellers, or even across different tablet computer brands. Imagine that a consumer shopping for a tablet computer is informed by the hidden transaction details elucidation service 124 of the true price for not only one brand of tablet computer including a cover, but also for other brands of tablet computers including associated covers. It is to be appreciated that a multitude of other item combination scenarios can be envisioned such that the trend analysis module 208 may enable generation of useful information regarding sellers, items and associated true price information. For instance, true price information may be compared across item categories such as automobiles, which may come with various options. The trend analysis module 208 is configured to determine likely item combinations including item options to yield information about true prices for each likely item combination across an entire item category.

In some embodiments, the analysis module 140 further includes a seller identification (ID) module 210 configured to identify other merchants who are selling the same item as a first seller, and/or merchants who are similar to the first seller in other ways. The identified sellers may be presented along with the first seller on a details page of an item such that a user 104 may be better informed about options from various sellers. The seller ID module 210 may identify an item sold by a first seller and then identify all other sellers associated with the same item in the data store 118 by accessing the seller data 146. Some or all of the other sellers identified by the seller ID module 210 may be presented with the first seller on a details page of the item for comparison. Accordingly, offer data 122 associated with each of the other sellers may be presented for comparison among the various sellers (e.g., true price information associated with each seller).

The seller ID module 210 may be configured to compare multiple sellers across a single product category, or across all categories, and/or sellers may be compared based on historical offer data 122 analyzed over time to find similar sellers to the first seller. Accordingly, the seller ID module 210 may find similar sellers to a first seller such that they may be presented to the users 104 on a details page of the first item offered by the first seller so that the users 104 can explore other options for acquiring the same item. In this scenario, various true price values may be compared for a single item across multiple merchants. Other data generated by analyzing multiple sellers may be revealed as well, such as a mean, median, mode, maximum and minimum true price values for a given item.

As detailed above with reference to FIG. 1, a rating module 142 is configured to determine a seller rating for any given seller based on the behavior of the seller as monitored by the hidden transaction details elucidation service 124. Criteria for designating the seller rating may include determining whether the hidden cost included for an item is excessive, whether the listed quantity of items in stock is lower than an actual quantity of items in stock, whether any items are in stock at all, whether the seller engages in bait-and-switch tactics with a high frequency, and similar criteria. The rating module 142 may output seller ratings for storage in the data store 118 in the form of the seller data 146.

Accordingly, in some embodiments, the analysis module 140 further includes a filtering module 212 configured to filter sellers based on the data in the data store 118. For example, the filtering module 212 may enable filtering, or sorting, of sellers according to whether the seller provides any amount of hidden cost with an item for sale. Alternatively, the filtering module 212 may filter on other criteria such as sellers that offer an item with a list price that is below a certain percentage or dollar amount of the true price for the item. In order to do this, the filtering module 212 may access the offer data 122 in the data store 118 as associated with various sellers. In some embodiments, the filtering module 212 is configured to filter sellers based on seller ratings, as indicated in the seller data 146. For example, sellers with ratings below a designated level, or who are otherwise designated as "untrustworthy" as determined by the rating module 142, may be filtered out from other sellers. In this manner, a user 104 has the ability to filter sellers based on the above criteria such that the user 104 is only presented with trustworthy sellers, or sellers that do not include excessive hidden costs with their item offerings. In this case, the filtering may be implemented via the user interface 116 for use by the users 104. In other embodiments, the filtering may be implemented by the host 102 in order to filter sellers out of a storefront page that includes merchandising spots for sellers to market their items. This would allow the host 102 to showcase only those merchants who are deemed to be more trustworthy than others.

Illustrative Processes

Figure 3:
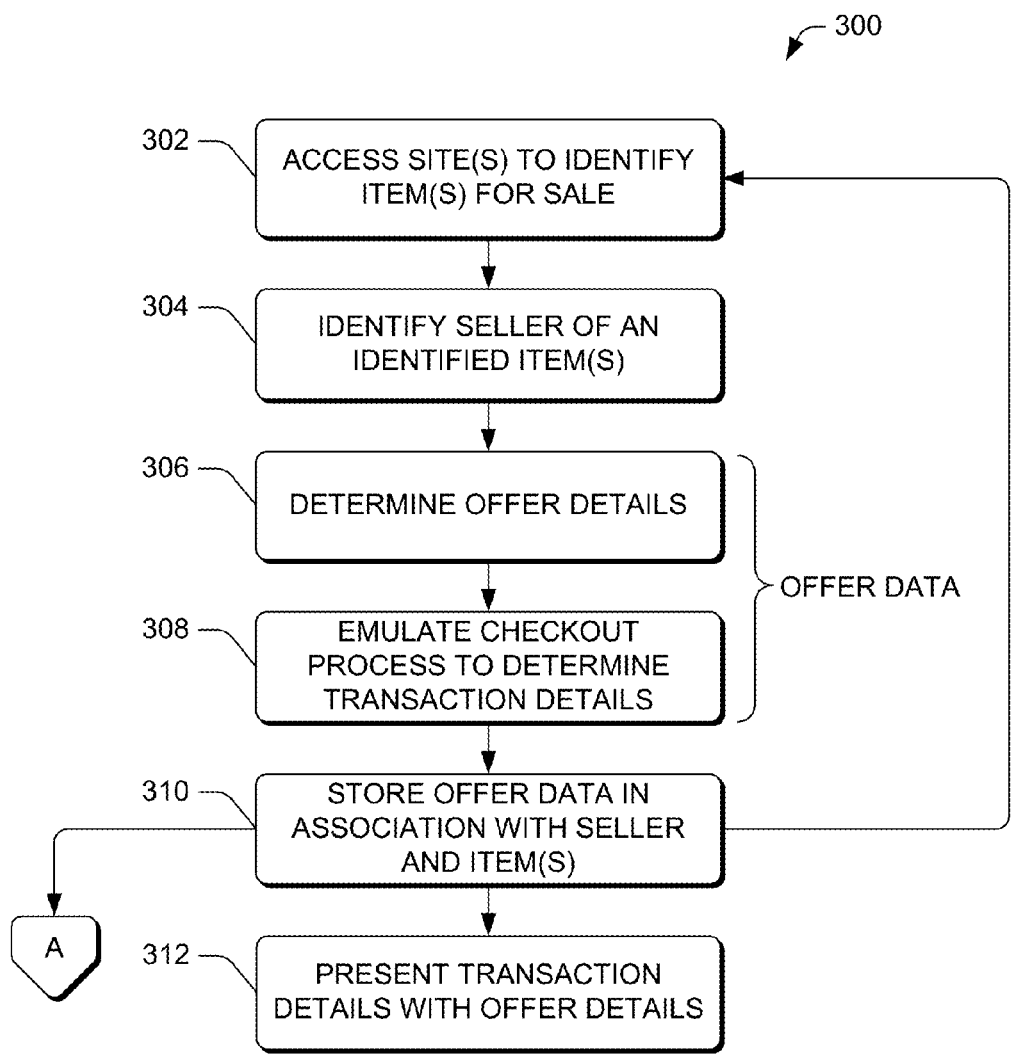
FIG. 3. is a flow diagram of an illustrative process to identify items, gather offer data associated with the items, and to provide transparency in the gathered offer data.
Figure 4:
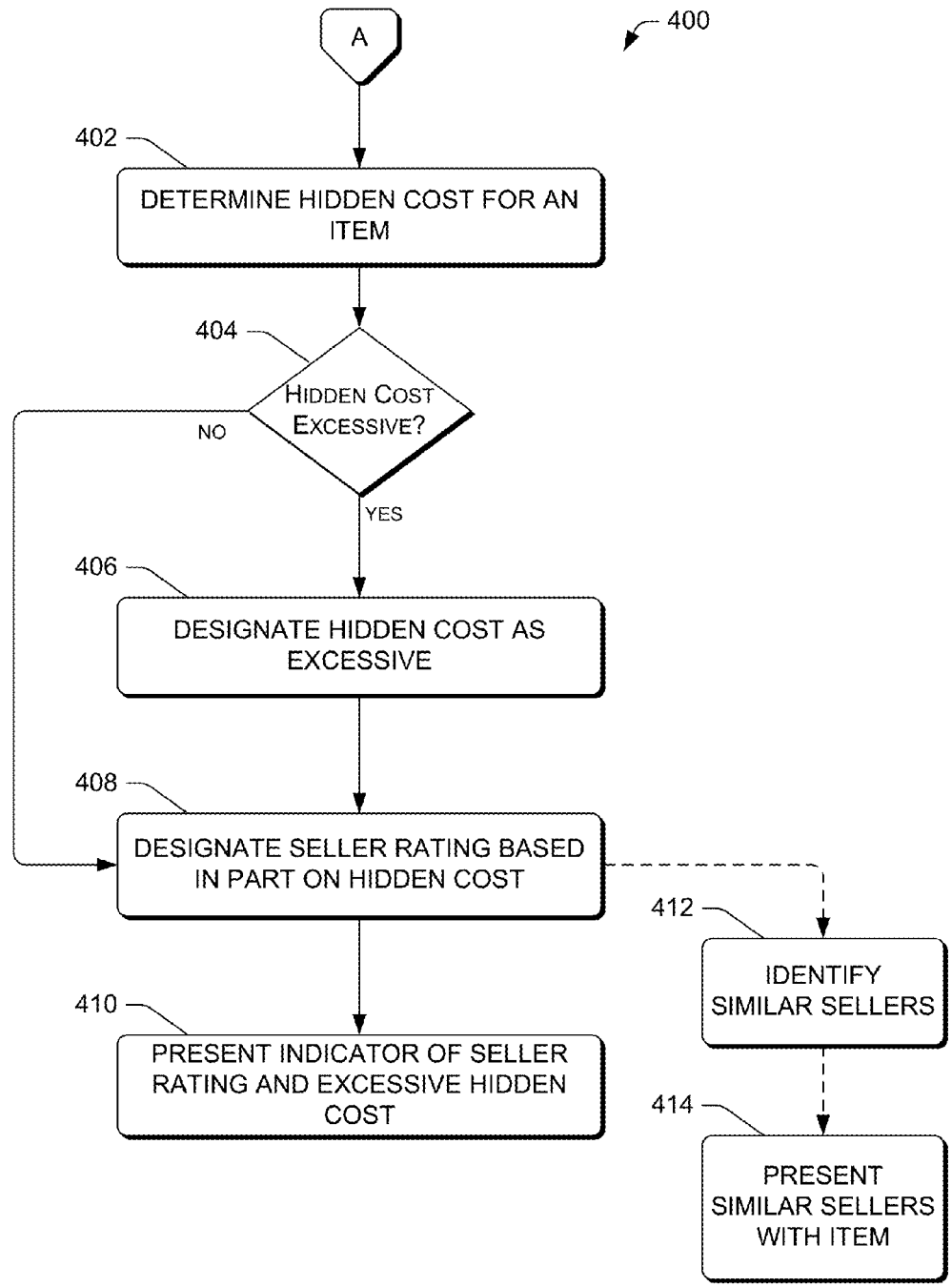
FIG. 4 is a flow diagram of an illustrative process to determine whether a hidden cost for an item is excessive, designate a seller rating, and to present indicators of the seller rating and excessive hidden cost.

FIGS. 3 and 4 show illustrative processes that are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to gather transaction details associated with an item transaction, and to provide transparency to the gathered transaction details in association with an item offering. For discussion purposes, the process 300 is described with reference to the architecture 100 of FIG. 1, and specifically with reference to the data gathering engine 130 and the data analysis engine 132. In particular, many acts described below may be implemented and performed by the crawler 136 and the analysis module 140. The process 300 allows for transparency in hidden transaction details, such as true price, associated with a transaction of an item, or group of items.

At 302, the crawler 136 accesses one or more sites to identify an item, or group of items, being offered. As discussed above, the crawler 136 may utilize bots to crawl one or more electronic marketplaces or other sites in a methodical manner to identify items, or bundles, that are offered for sale to consumers.

At 304, after an item(s) is identified, the crawler 136 identifies a seller of the item(s). The seller may be the website operator, such as the host 102, or the seller may be a third party seller 112 whose items are offered for sale on the site of the host 102. In any case, a seller identifier, such as a name, or identification number, is identified by the crawler 136 to associate the identified item with the seller.

At 306, the crawler 136 may determine offer details for the item. For example, the crawler 136 may identify a list price 122(c), a quantity of the item advertised as in stock, and other similar offer details. The offer details comprise information associated with a transaction for the item that the seller provides along with an offering of the item, such as details provided on a details page for the item.

At 308, the checkout emulator 138 emulates a human user proceeding through a checkout process for the item in order to determine transaction details associated with the item transaction. For instance, the checkout emulator 138 may add the identified item to a virtual cart, and may proceed through the checkout process for the item, which may include providing payment information, and possibly zip code information, or other parameters. The checkout emulator 138 is configured to proceed through the checkout process 308 until transaction details are obtained, such as the true price (i.e., total price of the item after additional fees and charges are included), a true quantity of items available for purchase, and similar transaction details. These transaction details determined at 308, along with the offer details determined at 306, are considered to be included within the offer data 122 of FIG. 1. In general, the transaction details comprise information associated with the item transaction that the seller provides after the checkout of the item has been initiated, and often far into the checkout process for the item.

At 310, the data gathering engine 130 stores the offer data 122, which was gathered at 306 and 308, in the data store 118 in association with the seller identified at 304 and the item(s) identified at 302. The crawler 136 is configured to run continuously for multiple, different items, as shown by the return arrow from 310 to 302. Furthermore, a checkout process for each item may be emulated across multiple permutations of parameters at 308, such as various zip codes, different payment methods, etc., to yield different transaction details for each iteration of item transaction at 308 for the same item. Similarly, the system is configured to periodically emulate the checkout process for each item after predetermined periods of time (e.g., hourly, daily, weekly, etc.) so that transaction details for the item may be determined for different times.

At 312, at least a portion of the transaction details as determined at 308 are accessed and presented along with the offer details determined at 306 such that a user 104 may make a better informed decision regarding the acquisition of the item. For example, the true price of the item may be presented at 312. The presentation at 312 may, in some embodiments, be via the UI 116 of the client 106(1), such as when a user 104 navigates a site of the host 102 and is presented with the transaction details along with the offer details when browsing items in a catalog of items, or searching for items using a search engine.

FIG. 4 is a flow diagram of an illustrative process 400 to determine whether a hidden cost for an item is excessive, designate a seller rating, and to present indicators of the seller rating and excessive hidden cost. The process 400 is described with reference to the analysis module 140, true price analysis module 204, and rating module 142 of FIG. 2. The process 400 may continue from the process 300 from step 310 as is shown by the designation "A" in FIGS. 3 and 4. As discussed with reference to the process 300 in FIG. 3, the order in which the operations are described with reference to the process 400 is not intended to be construed as a limitation, and any number of the described blocks can be combined in any order and/or in parallel to implement the process 400.

At 402, the true price analysis module 204 determines the hidden cost associated with an item as the difference between a listed price for the item and a true price for the item. In some embodiments, different hidden costs under varying parameters (e.g., different zip codes) may be determined for a single item at 402, as facilitated by the parameter selector 202.

At 404, the true price analysis module 204 determines whether the hidden cost for the item is excessive. The true price analysis module 204 may make this determination in various ways, as described above. For example, the hidden cost may be compared against a predetermined threshold to determine whether the hidden cost is higher than the threshold. In some embodiments, the threshold may be related to a bell curve which plots hidden costs for the same item as sold by multiple, different sellers. Hidden costs that are on the high side of the bell curve, perhaps outside of a predetermined number of standard deviations, may be designated as excessive. Thus, a "threshold" for excessiveness of hidden costs may be absolute, or it may be relative to hidden costs included by other sellers for the same item or item category. If the hidden cost is determined to be excessive at 404, the process proceeds to 406 where the hidden cost for the item is designated as excessive. This may be presented to a user 104 via the UI 116 such that a details page for the item includes an indicator (e.g., a color, label, button, etc.) that flags the item as having an excessive hidden cost. If the hidden cost is determined not to be excessive at 404, the system may omit labeling the item and proceed directly to 408, or it may optionally flag/label the item as having an acceptable hidden cost.

At 408, the rating module 142 may designate a seller rating for the seller based at least in part on the hidden cost determination at 404. That is, the rating of the seller may be designated according to whether the hidden cost included with the item for sale by that seller is determined to be excessive or acceptable. For example, if the hidden cost for the item is determined to be excessive at 404, the trust level of the seller may be decremented, or otherwise designated as "untrustworthy," at 408 to indicate that the seller is engaging in a type of bait-and-switch tactic. In this scenario, the seller rating is at the item level. It is contemplated that the designation of the seller rating at 408 may be based on cumulative historical data of the seller in terms of hidden costs included with items offered by the seller. For example, the seller rating designation at 408 may look at the frequency of excessive hidden costs from the seller over a period of time.

At 410, an indicator of the seller rating may be presented, such as on a detail page for the item sold by the seller where the seller is labeled in a way that is indicative of their designated rating. For example, a seller may be color coded by a "Green-Yellow-Red" color-coding scheme that signifies a spectrum of seller trustworthiness. Alternatively, a numerical rating system may be employed (e.g., five star rating) to indicate the rating. Various ways of indicating the seller rating and presenting the indicator at 410 may be envisioned by a person having ordinary skill in the art.

The process 400 may optionally find similar sellers to the seller of the item, as is shown by the dashed arrows leading to 412 and 414. Namely, at 412, the seller ID module 210 may identify other sellers that are similar to the seller identified at 304 of the process 300. As described above, this may be based on the rating of the seller, or other data pertaining to hidden costs included for the same or similar type of item. For example, the hidden cost determined for the first seller at 402 may be determined to fall above a certain point (e.g., two standard deviations) on a bell curve plotting all identified sellers of the same item. Accordingly, the seller ID module 210 may identify other sellers that include hidden costs for the same, or a similar type of item, in the same range on the bell curve. Alternatively, other sellers that sell the same item may be identified at 412. At 414, the similar sellers who were identified at 412 are presented along with the identified seller for consumption by the user 104.

Illustrative Interfaces

FIGS. 5A, 5B, 6 and 7 show illustrative user interfaces (UI). The UIs are provided as non-limiting examples of interfaces that may be used to perform some of the operations described with reference to the processes described herein.

Figure 5A:
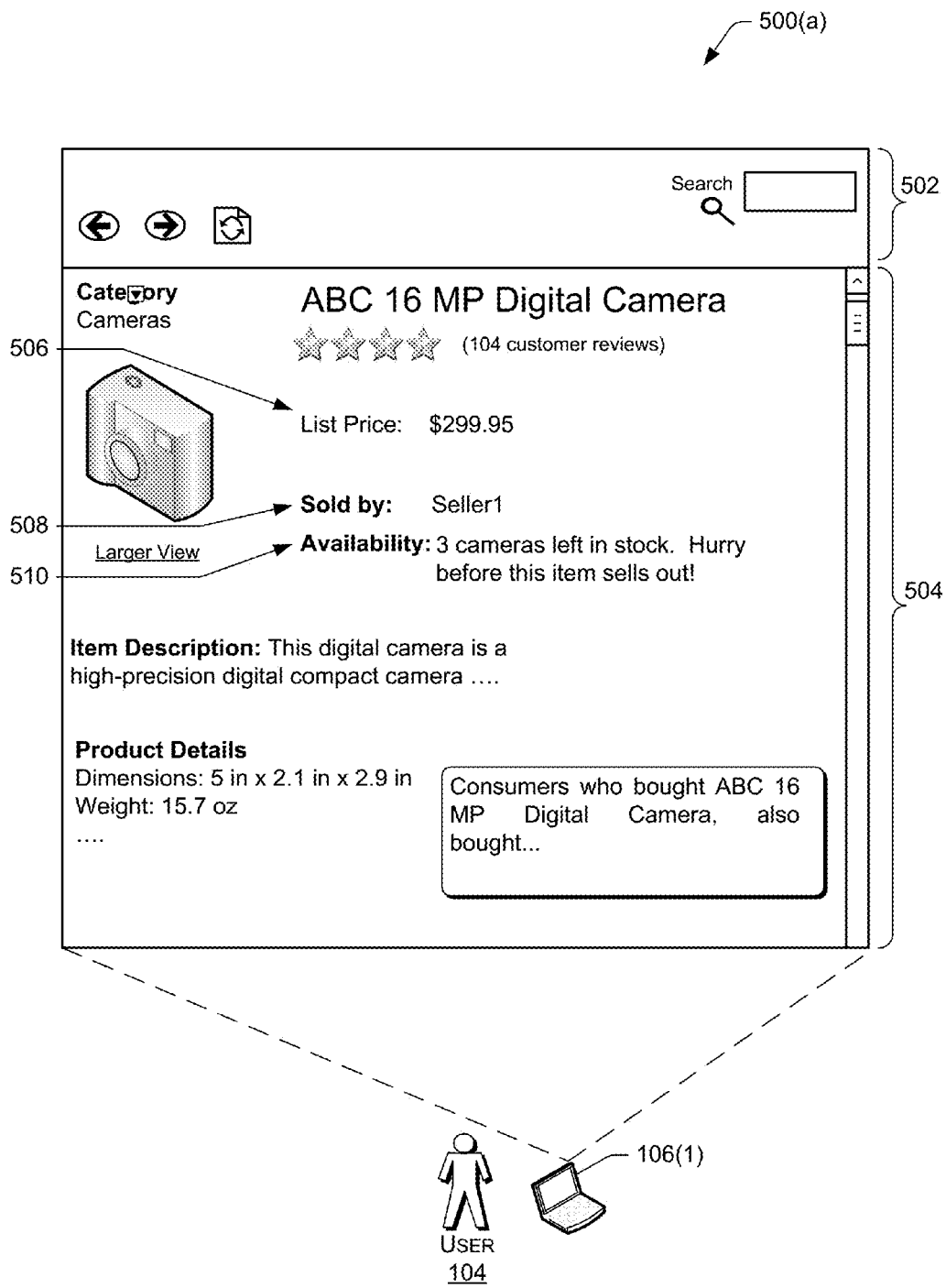
FIGS. 5A and 5B illustrate user interfaces (UI) before and after providing transparency in hidden transaction details, respectively.

FIG. 5A is an illustrative UI 500(a) of a typical item offering for an online transaction of an item. The UI 500(a) includes searching and browsing tools 502, such as a search field for entering queries used when searching an item catalog, and browser navigation tools/buttons (e.g., page forward, page backward, refresh, etc.) to facilitate browsing an online item catalog. The UI 500(a) may further include a details page 504 for an item that a user 104 may navigate to by using the searching and browsing tools 502. For example, FIG. 5A illustrates a details page for a digital camera.

The UI 500(a) may include pricing information 506 including a list price for the item, and a seller identification portion 508 which identifies the seller who is offering the particular item. In the example shown in FIG. 5A, the seller is identified as "Seller 1." The UI 500(a) may further include an availability portion 510 which indicates whether the item is in stock, and sometimes the quantity of the item left in stock. In some cases, there may even be a promotional message that indicates quantity is limited, or a similar message to entice buyers to acquire the item. The list price and the quantity of items in stock shown in FIG. 5A may be considered offer details provided by the seller and included in the item offering. Transaction details may be revealed after a user 104 adds the item to a virtual cart and proceeds through a checkout process, as will be shown in FIG. 5B.

Figure 5B:
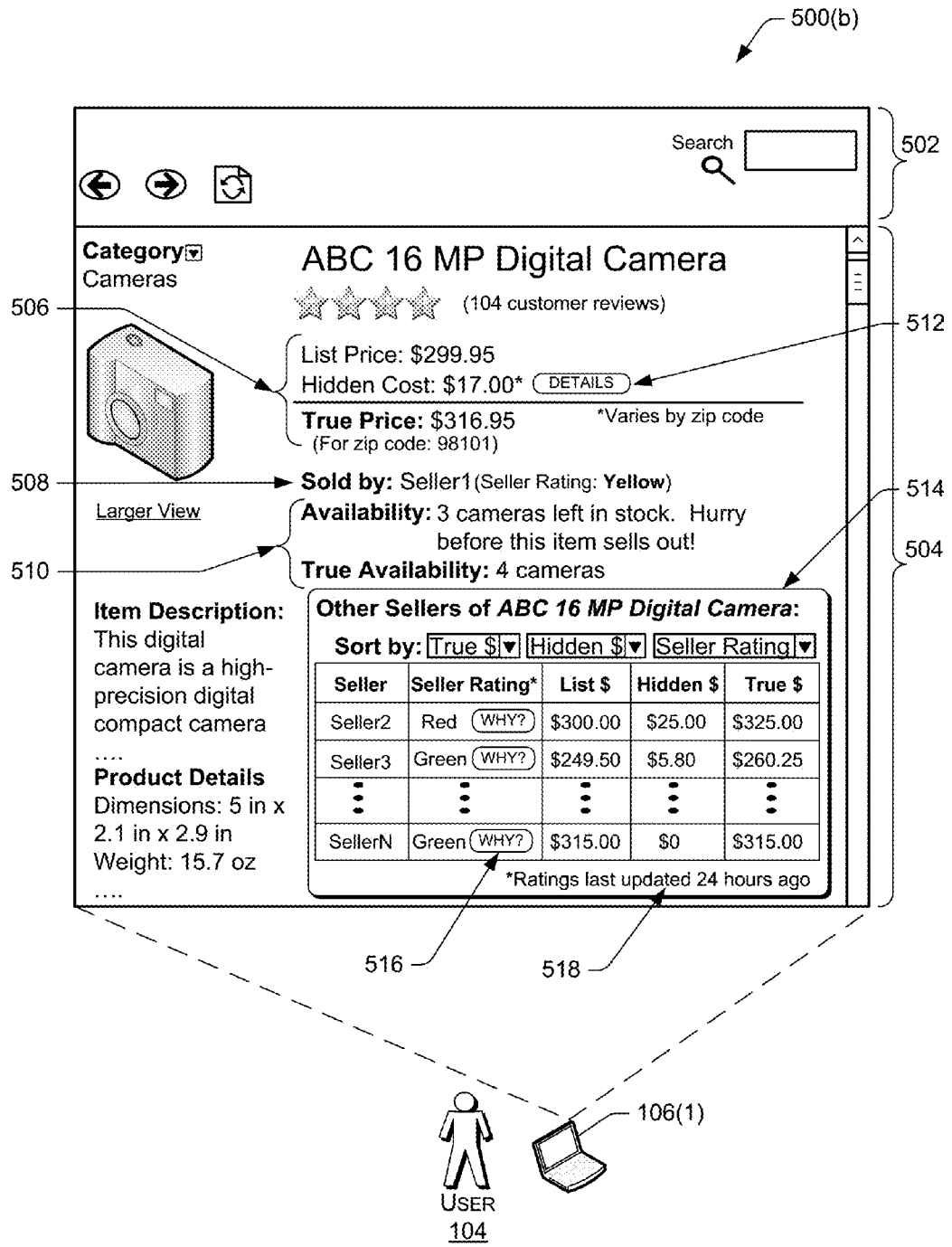

FIG. 5B is an illustrative UI 500(b) to provide transparency in hidden transaction details. The UI 500(b) includes the searching and browsing tools 502, such as a search field for entering queries used when searching an item catalog, and browser navigation tools/buttons (e.g., page forward, page backward, refresh, etc.) to facilitate browsing an online item catalog. Additionally, or alternatively, to the searching and browsing tools 502 shown in the UI 500(b) of FIG. 5B, other types of user input tools may be used for searching and browsing, such as voice command, and any other suitable techniques. The UI 500(b) further includes the details page 504 for an item that a user 104 may navigate to by using the searching and browsing tools 502. For example, FIG. 5B illustrates a details page for the same digital camera shown in FIG. 5A.

The UI 500(b) may include pricing information 506 including the list price for the item, as in FIG. 5A. In addition, the pricing information 506 of FIG. 5B may include a hidden cost, and a true price of the item, the true price being the sum of the list price and the hidden cost. As discussed above, the hidden cost may be determined by taking the difference between the true price and the list price, where the true price is determined by the checkout emulator 138 after proceeding through the checkout process for the item until all hidden fees and charges are included in a true price for the item. As can be seen in FIG. 5B, the hidden cost value is dependent on the zip code of the buyer. Thus, the pricing information 506 in this example was determined by the checkout emulator 138 by using the parameter selector 202 to select the zip code 98101. Similarly, the checkout emulator 138 and parameter selector 202 may have emulated the checkout process for other zip codes to determine different transaction details for the same item. Additional information associated with the hidden cost may be accessed via a details button 512 such that the user 104 can drill down into what types of fees and charges (e.g., shipping and handling, taxes, etc.) were included in the hidden cost calculation, and perhaps whether the hidden cost is designated as excessive. This information may also be provided on the details page of the item, but to save space, the details button 512 may be used to provide this additional information.

The UI 500(b) may also include the seller identification portion 508 which identifies the seller offering the particular item. In FIG. 5B, the seller identification portion 508 may also include an indication of a seller rating which can be an item rating, an item category rating, or even an overall rating for the seller. Thus, there may be a hierarchy of ratings for any given seller. In this example, the rating designated for Seller 1 is "Yellow" on a spectrum from Red to Yellow to Green, where Green indicates a rating of most trustworthy, and Red indicates a rating of least trustworthy. Other ways of indicating a trustworthiness for a seller may be used, such as numbering schemes, a binary designation (e.g., "trustworthy/untrustworthy"), or any suitable rating scheme. The seller rating may be based at least in part on the determination of the hidden cost shown in the pricing information 506. For example, if the hidden cost is determined to be excessive by the techniques disclosed herein, the seller rating may be decremented to Yellow or Red, as an overall trust level designation for the seller.

The UI 500(b) may further include the availability portion 510 which indicates whether the item is in stock, and sometimes how many items are left in stock. As previously described, the checkout emulator 138 may add more than the listed quantity of items in stock to determine whether the listed quantity is lower than an actual quantity of available items. In the example of FIG. 5B, the checkout emulator 138 can add 4 cameras to a virtual shopping cart and proceed to checkout to determine whether more than 3 cameras are actually in stock. The outcome of this process may factor into the seller rating for Seller 1 and may be presented in the availability portion 510 as an indication of the true availability of the item.

In some embodiments, the UI 500(b) includes a similar merchant table 514 in the details page 504 which lists other merchants that also sell the item. The sellers in the similar merchant table 514 may be determined to be similar to Seller 1 in various ways, as described above. The similar merchant table 514 may further include seller ratings for each seller, the list price that each other seller is selling the same item at, along with hidden costs and a true price to buy the item from each seller. In this way, a user 104 browsing an item, such as the digital camera shown in FIG. 5B, may be fully informed of the true price for the item as it is offered by multiple sellers, and may compare various sellers based on the information provided in the similar merchant table 514.

In some embodiments, the UI 500(b) includes detail buttons 516 which enable a user 104 to drill down and find out the basis for a particular seller rating. For example, upon selection of one of the detail buttons 516 for a seller in the similar merchant table 514, the user 104 may be informed of how frequently the seller has included excessive hidden costs in item transactions, which may have factored into the seller rating. In other cases, the rating may be based on the particular hidden cost amount for the item being sold in the details page 504. In any event, the user 104 is given the ability to learn more about what factored into the rating for a particular seller. The UI 500(b) may further include a message pane 518 indicating when the ratings were last updated, in order to give the user 104 an idea of how current the ratings are.

Figure 6:
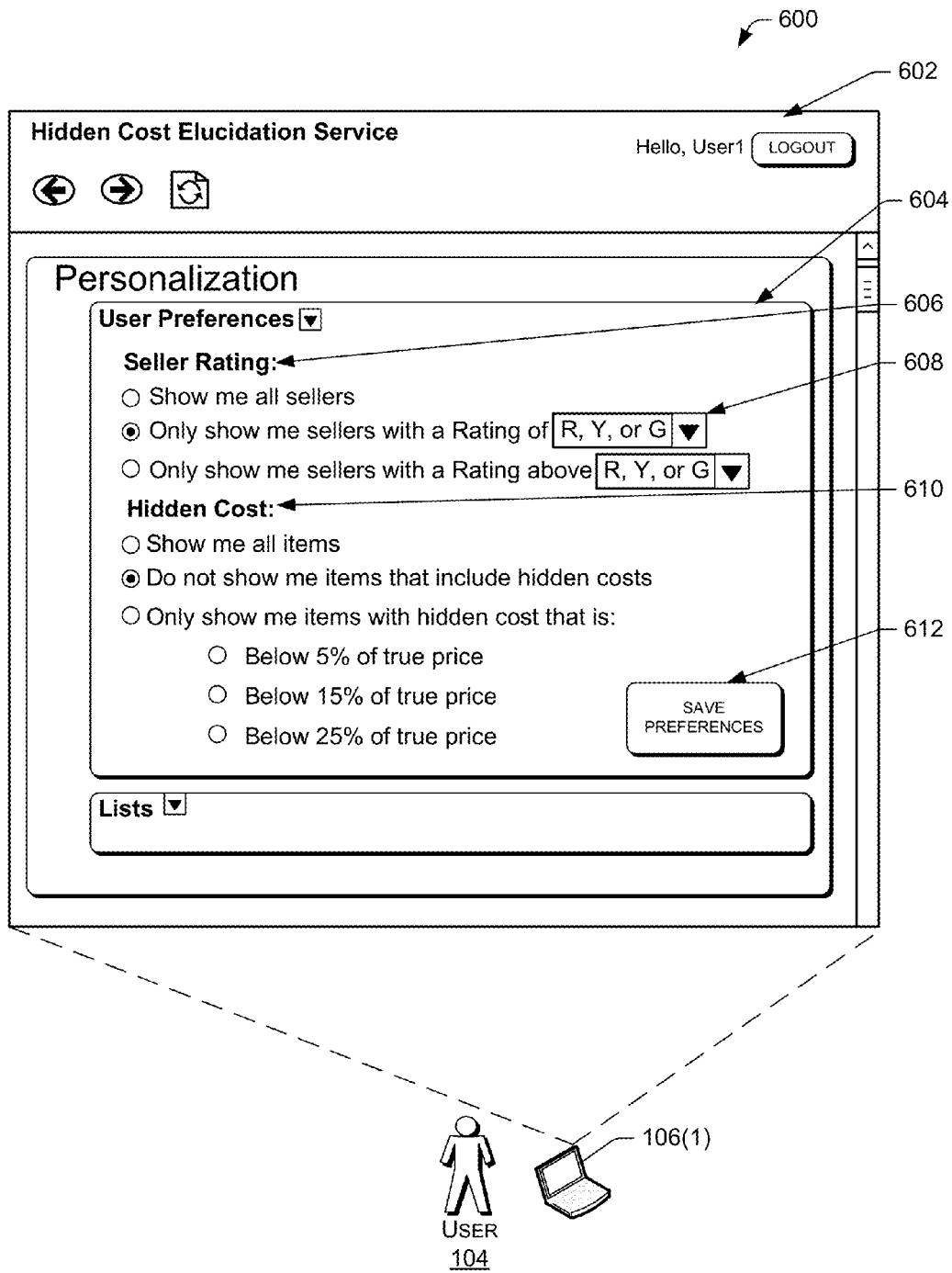
FIG. 6 is an illustrative UI to allow setting of user preferences regarding sellers and items to include in a searching and browsing experience.

FIG. 6 is an illustrative UI 600 of a personalization page for a user to specify preferences regarding how items are presented to the user.

The UI 600 may include a user account indicator 602 to indicate that a user is logged into a user account, such as an account maintained and controlled by the host 102 for logging into a personalized view of the host's 102 site. The user account may include information associated with the user 104, such as a user identification (ID), an email address, a shipping address, and/or an alias for the user, etc. The user account may provide the user 104 access to a data profile associated with the user 104 which includes this and other information relating to the user 104. By logging into a user account, a user 104 is able to change preferences associated with the user account, and specifically, to edit preferences regarding what types of sellers or items are shown to the user 104.

Accordingly, the UI 600 may include a user preferences section 604 where a user 104 may set preferences regarding sellers and items that are to be shown to the user 104 when the user 104 searches or browses for items. The user preferences section 604 may include a seller rating preference portion 606 which enables the user 104 to specify whether they would like to see items from all sellers, regardless of their rating, or whether they would like to only see sellers of a certain rating or range of ratings. In the example shown in FIG. 6, the user 104 has selected a preference where sellers with a particular rating are only shown to the user 104. The user 104 may select the seller rating of their preference with a drop down mechanism 608, or similar software UI tool.

The UI 600 may also include a hidden cost preference portion 610 where the user 104 may specify items that are to be shown to the user 104 based on the hidden costs associated with the item. For example, a user 104 may specify that they do not want to see any items that include hidden costs, or they may specify a percentage of the true price that the hidden costs can make up. The object is to give the user 104 freedom to choose what type of sellers and/or items they want to see during their shopping experience, such as on an e-commerce site provided by the host 102. A save preferences button 612 may be included in the UI 600 to allow the user 104 to save their user preferences.

Figure 7:
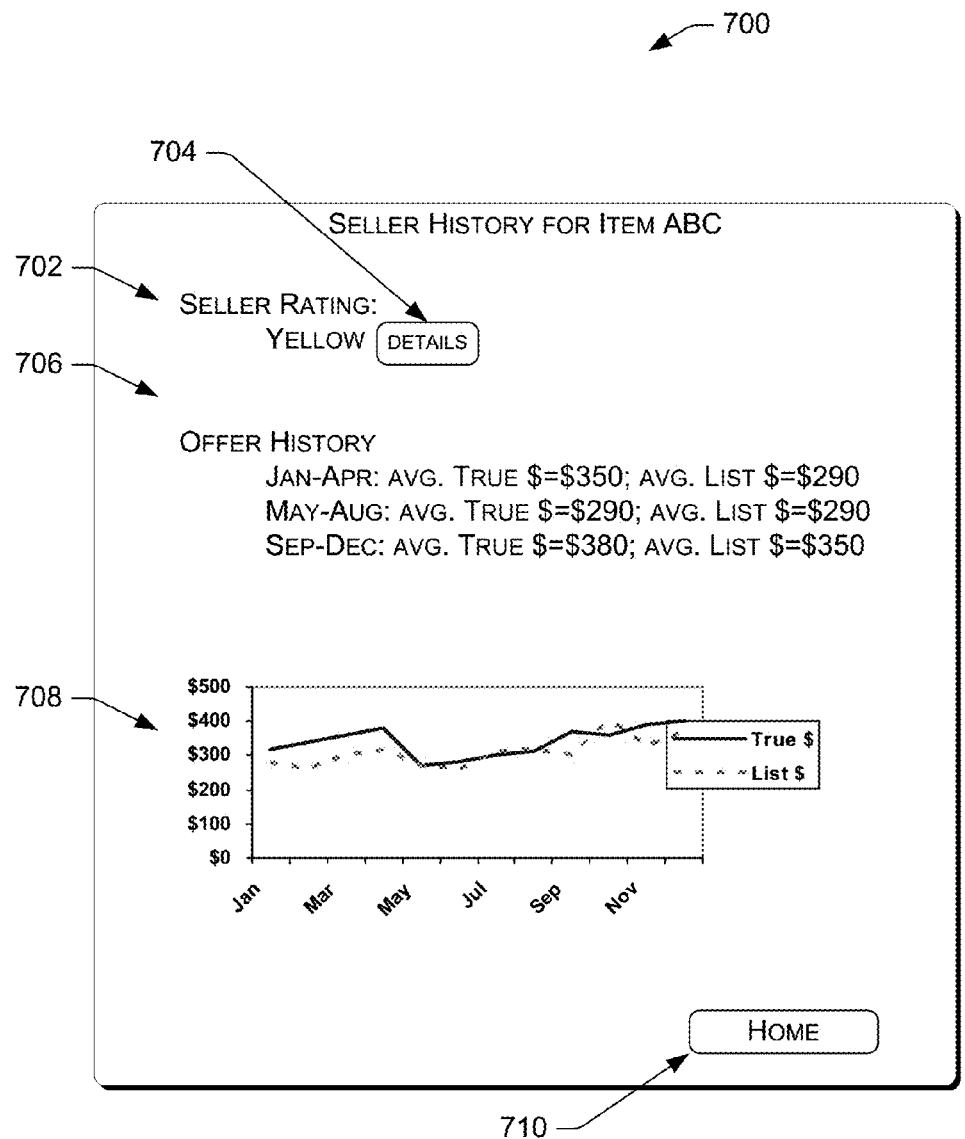
FIG. 7 is an illustrative UI to allow for reporting on seller history for item offerings over time.

FIG. 7 is an illustrative UI 700 of a reporting page for reporting data on a seller history regarding offer data 122 for a specific item sold by the seller.

The UI 700 may include a seller rating portion 702 for indicating a seller rating. A details button 704 may be provided to offer details regarding the seller rating, similar to that described with reference to FIG. 5. For example, upon selection of the details button 704, information regarding the history of the seller's behavior that factored into the seller rating may be revealed, or other details related to hidden costs the seller often includes with items may be revealed.

The UI 700 may include an offer history section 706 that details a summary of the history for the seller in regards to the offer data 122 for a particular item over a period of time. The UI 700 may also include a graph 708 which illustrates the data gathered for the seller, such as data generated by the trend analysis module 208 of FIG. 2 and stored as statistics data 144 in FIG. 1. In the example shown in FIG. 7, the graph may illustrate a comparison of true price and list price over time for a given seller of a given item. Other ways of collecting and analyzing data may be presented by a similar UI to that shown in FIG. 7. The UI 700 is just one example UI that may present data that has been analyzed over time for a given seller. The UI 700 may include a navigation button 710 which allows the user to navigate back to a home page, or to another report page UI for a different seller.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising: under control of one or more processors of a computing device, identifying an item offered for sale at an electronic marketplace by an automated agent accessing a web page associated with the electronic marketplace and crawling the web page for identifying information associated with the item, wherein the automated agent comprises instructions stored in memory of the computing device and executable by the one or more processors;
   identifying a seller of the item by the automated agent crawling the web page for identifying information associated with the seller;
   extracting offer details associated with the item by the automated agent crawling the web page for the offer details and storing the offer details in a data store;
   employing, by the automated agent a checkout emulator to:

select a first geographic location and a second geographic location; proceed through a first simulated checkout process for the item on the web page up to a point in the first simulated checkout process without acquiring the item, the automated agent specifying the first geographic location as part of the first simulated checkout process;

proceed through a second simulated checkout process for the item on the web page up to a point in the second simulated checkout process without acquiring the item, the automated agent specifying the second geographic location as part of the second simulated checkout process;

determine a first hidden cost associated with a first transaction for the item, the first hidden cost comprising a first added charge that is included in the first transaction for the item and revealed after the automated agent proceeds through the first simulated checkout process up to the point in the first simulated checkout process; and determine a second hidden cost associated with a second transaction for the item, the second hidden cost comprising a second added charge that is included in the second transaction for the item and revealed after the automated agent proceeds through the second simulated checkout process up to the point in the second simulated checkout process;

comparing the first hidden cost and the second hidden cost to a threshold; determining that the first hidden cost or the second hidden cost exceeds the threshold;

determining, based at least in part on the first hidden cost or the second hidden cost exceeding the threshold, a frequency at which the seller has provided excessive hidden costs with item offerings;

designating a rating for the seller indicative of a reputation of the seller, the rating being based at least in part on the frequency at which the seller has provided the excessive hidden costs;

identifying at least one other seller of the item by the automated agent crawling at least one other web page that is offering the item from the at least one other seller;

employing, by the automated agent the checkout emulator to:

proceed through a third simulated checkout process for the item on the at least one other web page up to a point in the third simulated checkout process without acquiring the item, the automated agent specifying the first geographic location as part of the second simulated checkout process; and determine a third hidden cost associated with a third transaction for the item, the third hidden cost comprising a third added charge that is included in the third transaction for the item and revealed after the automated agent proceeds through the third simulated checkout process up to the point in the third simulated checkout process;

comparing the third hidden cost to the threshold; determining that the third hidden cost does not exceed the threshold; determining, based at least in part on the third hidden cost not exceeding the threshold, a frequency at which the at least one other seller has provided excessive hidden costs with item offerings;

designating an additional rating for the at least one other seller indicative of a reputation of the at least one other seller, the additional rating being based at least in part on the frequency at which the at least one other seller has provided the excessive hidden costs;

storing at least the rating, the first hidden cost, and the second hidden cost in the data store in association with the item and the seller;

storing at least the additional rating and the third hidden cost in the data store in association with the item and the at least one other seller;

receiving a request, from a user device, to access the web page; determining that the request is associated with the first geographic location; and serving, in response to the request, the web page to the user device, wherein the item, the seller, the rating of the seller, the first hidden cost, the at least one other seller, and the additional rating of the at least one other seller are presented on the web page along with the offer details in an electronic offering of the item.

2. The method of claim 1, wherein the offer details include at least a list price for the item, the method further comprising determining a true price for the item, the true price being a sum of at least the list price and the first hidden cost.

3. The method of claim 1, further comprising:
designating the first hidden cost as excessive based at least in part on the hidden cost exceeding the threshold.

4. The method of claim 1, wherein the rating is associated with a product category of the item.

5. A method comprising: under control of one or more processors of a computing device, crawling, by a software agent, one or more web pages to identify an item presented in an item offering on a web page of the one or more web pages; identifying a seller of the item; extracting offer details in the item offering;

employing, by the software agent a checkout emulator to:
proceed through a first simulated ordering process for acquiring the item, the automated agent specifying a first geographic location as part of the first simulated ordering process;

determine a first hidden cost associated with a first transaction for the item, the first hidden cost comprising a first added charge that is included in the first transaction for the item and revealed after the first simulated ordering process is initiated;

proceed through a second simulated ordering process for acquiring the item, the automated agent specifying a second geographic location as part of the second simulated ordering process;

determine a second hidden cost associated with a second transaction for the item, the second hidden cost comprising a second added charge that is included in the second transaction for the item and revealed after the second simulated ordering process is initiated;

comparing the first hidden cost and the second hidden cost to a threshold;

determining that the first hidden cost or the second hidden cost exceeds the threshold;

designating a rating for the seller indicative of a reputation of the seller, the rating being based at least in part on the first hidden cost or the second hidden cost exceeding the threshold;

identifying at least one other seller of the item by the software agent crawling the one or more web pages to identify the item presented in another item offering on at least one other web page of the one or more web pages;

employing, by the software agent the checkout emulator to:

proceed through a third simulated ordering process for acquiring the item on the at least one other web page, the automated agent specifying the first geographic location as part of the third simulated ordering process;

determine a third hidden cost associated with a third transaction for the item, the third hidden cost comprising a third added charge that is included in the third transaction for the item and revealed after the third simulated ordering process is initiated;

comparing the third hidden cost to a threshold; determining that the third hidden cost does not exceed the threshold; designating an additional rating for the at least one other seller indicative of a reputation of the at least one other seller, the additional rating being based at least in part on the third hidden cost not exceeding the threshold;

storing at least the rating, the first hidden cost, and the second hidden cost in a data store in association with the item and the seller;

storing at least the additional rating and the third hidden cost in the data store in association with the item and the at least one other seller;

receiving a request, from a user device, to access the web page; determining that the request is associated with the first geographic location; and causing the item, the rating of the seller, the first hidden cost, the at least one other seller, and the additional rating of the at least one other seller to be presented along with the offer details in the item offering.

6. The method of claim 5, wherein the rating is further based on a frequency that the seller has provided excessive hidden costs with other item offerings.

7. The method of claim 5, wherein the offer details include at least a list price for the item, the method further comprising determining a true price for the item, the true price being a sum of at least the list price and the first hidden cost.

8. The method of claim 5, further comprising:
designating the first hidden cost as excessive based at least in part on the first hidden cost exceeding the threshold.

9. The method of claim 5, wherein the rating is associated with a product category of the item.

10. The method of claim 5, wherein the rating is indicative of a trust level on a rating spectrum from a minimum trust level to a maximum trust level.

11. The method of claim 10, wherein designating the rating for the seller comprises decrementing an existing rating on the rating spectrum to a lower rating.

12. The method of claim 5, wherein causing the rating to be presented along with the offer details in the item offering comprises presenting the rating in the form of at least one of a color-coded rating or a numerical rating.

13. The method of claim 5, further comprising:
causing a details button to be presented in association with the rating; and
in response to selection of the details button, causing presentation of information that factored into the rating.

14. A system comprising:
one or more processors;
one or more memories;
a crawler maintained in the one or more memories and executable by the one or more processors to crawl one or more web pages to identify an item presented in an item offering, to identify a seller of the item, to extract offer details in the item offering, and to identify at least one other seller of the item presented in another item offering;

a checkout emulator maintained in the one or more memories and executable by the one or more processors to execute an automated task to:
proceed through a first simulated ordering process for acquiring the item from the seller to determine a first hidden cost associated with a first transaction for the item, the checkout emulator specifying a first geographic location as part of the first simulated ordering process, the first hidden cost comprising a first added charge that is included in the first transaction for the item and revealed after the first simulated ordering process is initiated, wherein the crawler and the checkout emulator comprise one or more software agents configured to execute automated tasks over a network;

proceed through a second simulated ordering process for acquiring the item from the seller to determine a second hidden cost associated with a second transaction for the item, the checkout emulator specifying a second geographic location as part of the second simulated ordering process, the second hidden cost comprising a second added charge that is included in the second transaction for the item and revealed after the second simulated ordering process is initiated; and proceed through a third simulated ordering process for acquiring the item from the at least one other seller to determine a third hidden cost associated with a third transaction for the item, the checkout emulator specifying the first geographic location as part of the third simulated ordering process, the third hidden cost comprising a third added charge that is included in the third transaction for the item and revealed after the third simulated ordering process is initiated;

a true price analysis module maintained in the one or more memories and executable by the one or more processors to compare the first hidden cost, the second hidden cost, and the third hidden cost to a threshold and to determine whether each of the first hidden cost, the second hidden cost, and the third hidden cost exceeds the threshold;

a rating module maintained in the one or more memories and executable by the one or more processors to designate a rating for the seller indicative of a reputation of the seller, and to designate an additional rating for the at least one other seller indicative of a reputation of the at least one other seller, the rating being based at least in part on whether the first hidden cost or the second hidden cost exceeds the threshold, the additional rating being based at least in part on whether the third hidden cost exceeds the threshold; and a graphical user interface to cause a display, in response to receiving a request associated with the first geographic location to access a web page of the one or more web pages, of the rating of the seller, the first hidden cost, and the additional rating of the at least one other seller with the offer details in the item offering.

15. The system of claim 14, wherein the offer details include at least a list price for the item, and wherein the checkout emulator is further configured to determine a true price for the item, the true price being a sum of at least the list price and the first hidden cost.

16. The system of claim 15, the true price analysis module is further configured to:
designate the first hidden cost as excessive based at least in part on the first hidden cost exceeding the threshold.

17. The system of claim 14, wherein the rating is further based on a frequency that the seller has provided excessive hidden costs with other item offerings.

18. The system of claim 14, wherein the rating is associated with a product category of the item.

19. The system of claim 14, wherein the rating is indicative of a trust level on a rating spectrum from a minimum trust level to a maximum trust level.

20. The system of claim 19, wherein designating the rating for the seller comprises decrementing an existing rating on the rating spectrum to a lower rating.

21. The system of claim 14, wherein causing the display of the rating with the offer details in the item offering comprises presenting the rating in the form of at least one of a color-coded rating or a numerical rating.

22. The system of claim 14, wherein the graphical user interface is further configured to cause a display of a details button associated with the rating that, upon selection, reveals information that factored into the rating.

* * * * *